US006422483B1

(12) United States Patent
Yocom et al.

(10) Patent No.: US 6,422,483 B1
(45) Date of Patent: Jul. 23, 2002

(54) ARTICULATED SPRAY BOOM APPARATUS

(75) Inventors: Ross E. Yocom; Roger E. Yocom, both of Cable, OH (US)

(73) Assignee: Yocom L.L.C., Urbana, OH (US)

( * ) Notice: Subject to any disclaimer, the term of this patent is extended or adjusted under 35 U.S.C. 154(b) by 36 days.

(21) Appl. No.: 09/724,110

(22) Filed: Nov. 28, 2000

(51) Int. Cl.[7] .................................................. B05B 1/20
(52) U.S. Cl. ........................ 239/159; 239/161; 239/166
(58) Field of Search ................................ 239/146, 159, 239/161, 163, 166, 168, 169, 172, 175, 176; 248/235, 241, 285.1

(56) References Cited

U.S. PATENT DOCUMENTS 2,995,307 A * 8/1961 McMahon .................. 239/124
3,581,993 A * 6/1971 Reams ....................... 239/158
5,178,328 A * 1/1993 Broyhill ..................... 172/311

* cited by examiner

*Primary Examiner*—Lisa A. Douglas
(74) *Attorney, Agent, or Firm*—Mark A. Navarre

(57) ABSTRACT

A vehicle-borne spray boom apparatus has multiple articulated sections that are foldable and individually supported with respect to the ground to maintain a consistent and optimal distance between the boom sections and the ground on hilly and uneven terrain. A center section of the boom is mounted on a forward facing frame element of the vehicle, and boom arms extending from either end of the center section each comprise at least first and second sections, each supported by a ground-engaging wheel. Each first section is coupled at one end to the center section to permit vertical inclination with respect to the center section, and each second section is coupled at one end to a respective first section to permit vertical inclination with respect to such first section. The coupling between the central and first sections additionally permits relative horizontal inclination, and releasable latch mechanisms are triggered upon full horizontal extension of the first sections to maintain proper alignment between the first and center sections.

9 Claims, 6 Drawing Sheets

ARTICULATED SPRAY BOOM APPARATUS

TECHNICAL FIELD

This invention relates to a vehicle-borne spray boom for wide pattern application of a liquid chemical to the grounds of a golf course or the like.

BACKGROUND OF THE INVENTION

Vehicle-borne spray booms are commonly used in agricultural and commercial applications for applying liquid chemicals such as fertilizer, herbicide or insecticide over an expansive area such as a field, park, golf course, etc. The liquid chemical is typically stored in a tank carried or towed by the tractor, and is dispense through an array of spray nozzles distributed along the length of the spray boom. The boom is generally is generally provided with a mounting plate at its midpoint, and the boom arms are laterally cantilevered from the mounting plate. Also, the boom arms are commonly divided into sections that are hinged and foldable for ease of transportation and storage.

Spray booms of the type described above are obviously best suited for use on relatively flat terrain so that a generally consistent distance is maintained between the ground and the spray nozzles, ensuring even application of the liquid chemical. However, flat terrain is frequently not the norm in parks and golf courses, resulting in uneven application of the liquid chemical, and in some cases, interference between the ground and the boom. These disadvantages can be avoided to some extent by elevating the entire boom, but elevating the boom makes the spray pattern more susceptible to wind effects, and optimal application of a liquid chemical is usually achieved when the spray nozzle is maintained within about 12–24 inches of the ground surface, depending on the nozzle design. Accordingly, what is needed is a spray boom that retains the advantages of currently known devices, but which is capable of maintaining a consistent and optimal distance between the spray nozzles and the ground on hilly and uneven terrain.

SUMMARY OF THE INVENTION

The present invention is directed to an improved vehicle-borne spray boom apparatus having multiple articulated sections that are foldable and individually supported with respect to the ground to maintain a consistent and optimal distance between the boom sections and the ground on hilly and uneven terrain. A center section of the boom is mounted on a forward facing frame element of the vehicle, and boom arms extending from either end of the center section each comprise at least first and second sections, each supported by a ground-engaging wheel. Each first section is coupled at one end to the center section to permit vertical inclination with respect to the center section, and each second section is coupled at one end to a respective first section to permit vertical inclination with respect to such first section. The coupling between the central and first sections additionally permits relative horizontal inclination, and releasable latch mechanisms are triggered upon full horizontal extension of the first sections to maintain a proper alignment between the first and center sections. In a preferred implementation, each of the second sections includes a tip portion (or third section) that is hinged to permit rearward horizontal inclination with respect to the remainder of the second section and a spring coupling for biasing the tip portion into alignment with the second section.

DESCRIPTION OF THE PREFERRED EMBODIMENT

Figure 1:
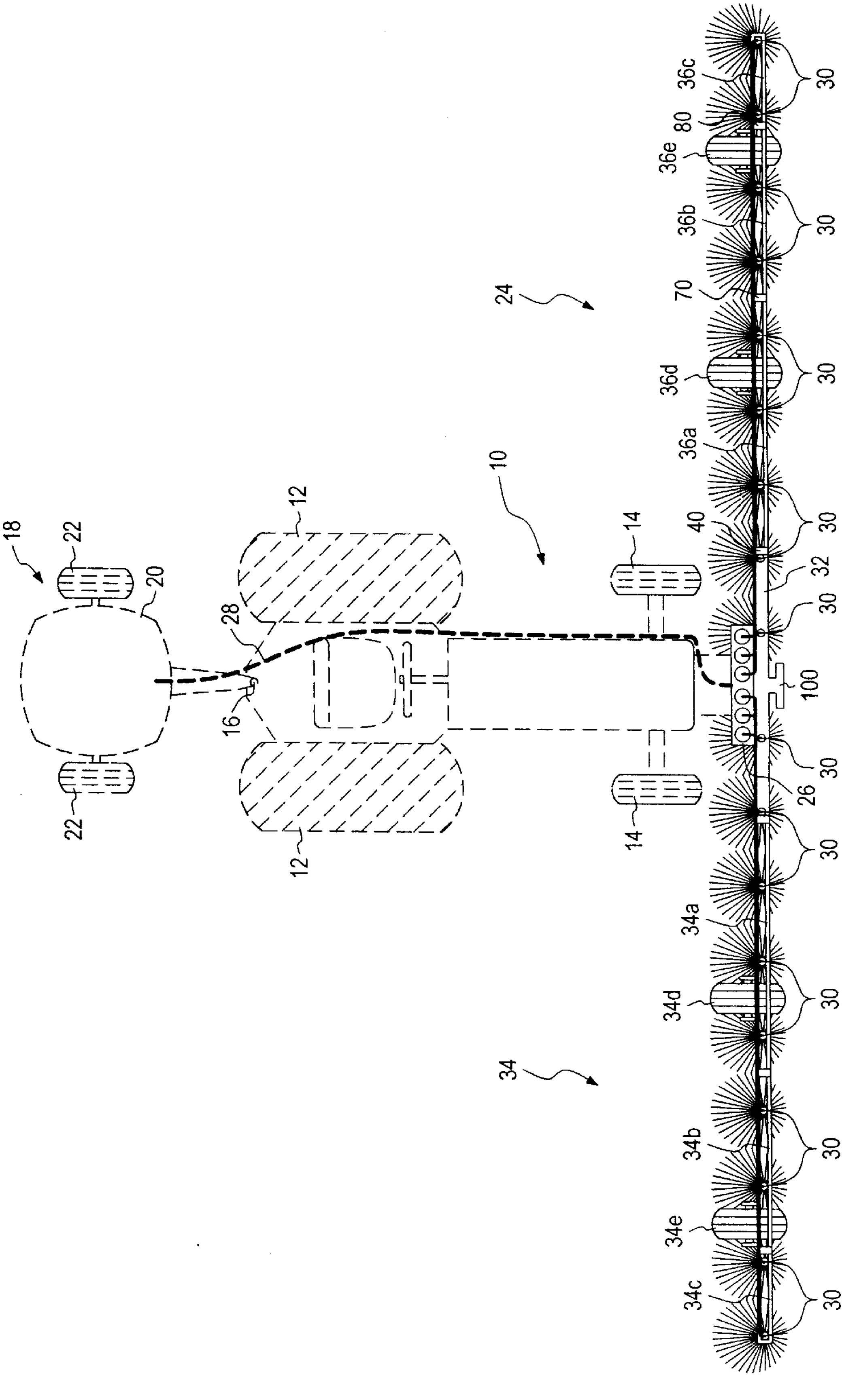
FIG. 1 is an overhead view of the spray boom of this invention, as mounted on a tractor.

Referring to the drawings, and particularly to FIG. 1, the reference numeral 10 generally designates a ground vehicle such as a small commercial or agricultural tractor equipped with soft, high floatation rear and front tires 12, 14 that distribute its weight and enable it to be driven over well-groomed sod (such as a golf course fairway or green) without damaging the sod or creating permanent impressions in the underlying soil. The tractor 10 is adapted to tow (via the illustrated single point hitch 16 or a standard three-point hitch) a wheeled trailer 18 supporting a large tank 20 designed to contain liquid fertilizer, herbicide, insecticide, or the like. As with the tractor 10, the trailer 18 is equipped with soft, high floatation tires 22 that distribute the weight of the trailer 18 and the liquid contained in tank 20. A spray boom, generally designated by the reference numeral 24, and mounted on the front of tractor 10, is equipped with a commercially available spray distribution system 26 that receives pressurized liquid from tank 20 via hose 28. A plurality of spray nozzles 30 disposed in distributed fashion along the length of spray boom 24 are coupled to the spray distribution system 26 so that liquid from the tank 20 is directed toward the ground in a series of fine spray patterns along the length of boom 24 as shown. Optionally, the lateral ends of the boom 24 may be equipped with a marking device such as a foam dispenser for purposes of visibly identifying the extent of the spray pattern.

According to the present invention, the boom 24 comprises a central section 32 mounted on tractor 10, and a pair of boom arms 34 and 36 coupled to the left and right lateral ends of central section 32, as depicted in FIG. 1. Each of the boom arms 34, 36 comprises first, second and third sections 34*a*, 34*b*, 34*c*; 36*a*, 36*b*, 36*c*. In boom arm 34: the first section 34*a* is coupled to the central section 32 so as to support both horizontal and vertical inclination of the first section 34*a* with respect to the central section 32, the second section 34*b* is coupled to the first section 34*a* so as to support only vertical inclination of the second section 34*b* with respect to the first section 34*a*; and the third section 34*c* is coupled to the second section 34*b* so as to support only rearward horizontal inclination of the third section 34*c* with respect to the second section 34*b*. Likewise in boom 36: the first section 36*a* is coupled to the central section 32 so as to support both horizontal and vertical inclination of the first section 36*a* with respect to the central section 32, the second section 36*b* is coupled to the first section 36*a* so as to support only vertical inclination of the second section 36*b* with respect to the first section 36*a*; and the third section 36*c* is coupled to the second section 36*b* so as to support only rearward horizontal inclination of the third section 36*c* with respect to the second section 36*b*. Finally, a first pair of wheels 34*d*, 36*d* are mounted on the respective first sections 34*a*, 36*a*, and a second pair of wheels 34*e*, 36*e* are mounted on the respective second sections 34*b*, 36*b*, such that the wheels engage the ground and support the boom arms 34, 36 when the boom arms 34, 36 are fully extended as shown in FIG. 1.

Figure 2A:
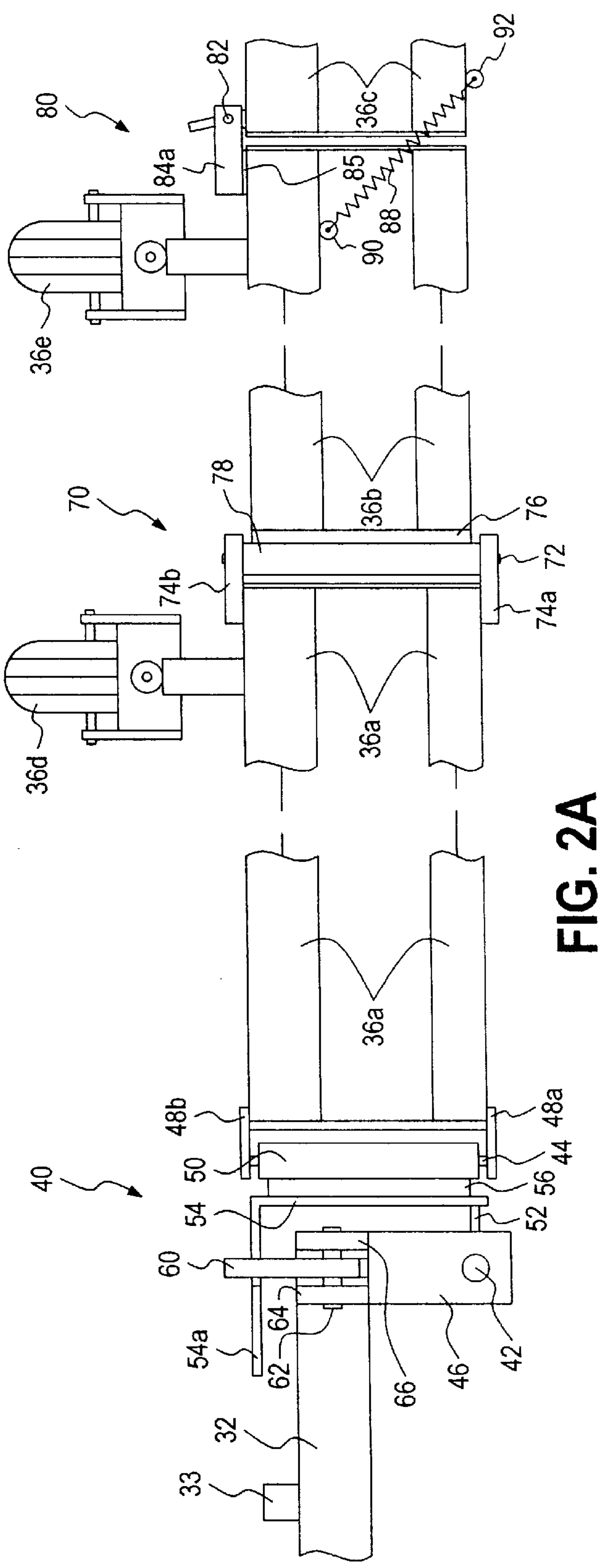
FIGS. 2A and 2B are partial top and frontal views of one side of the spray boom of FIG. 1.
Figure 2B:
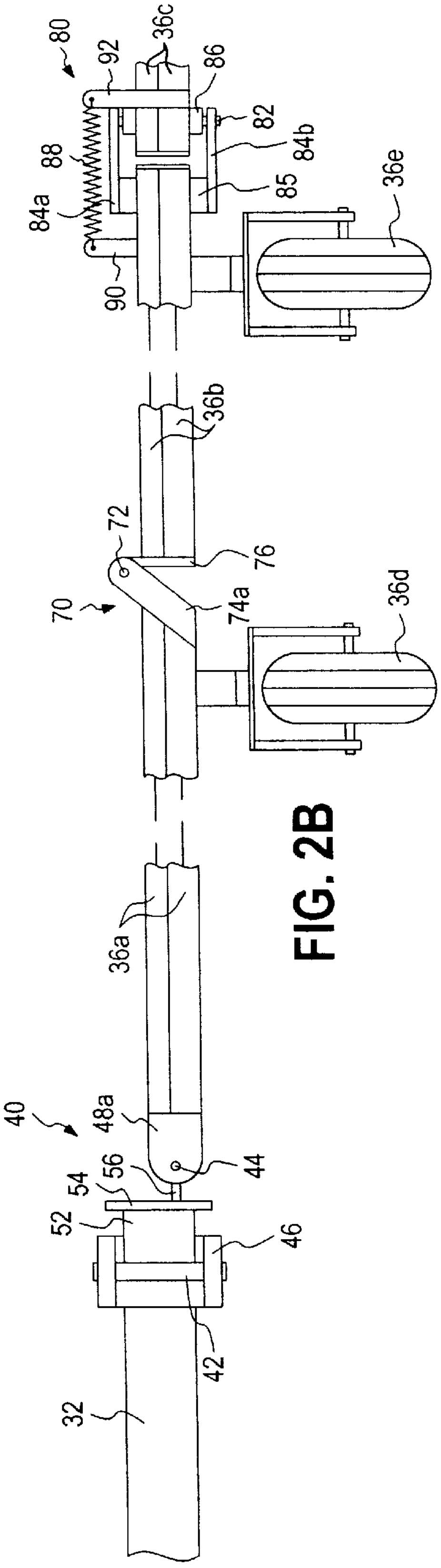

The couplings between the central, first, second and third sections 32, 36*a*, 36*b*, 36*c* are depicted in detail in the top and frontal views of FIGS. 2A and 2B, respectively, with the spray nozzles 30 and associated hoses being omitted for clarity. Of course, the boom sections 34*a*, 34*b*, 34*c* are the mirror image of the illustrated boom sections 36*a*, 36*b* 36*c*. Also, it will be noted that he central boom section 32 is formed with a single tubular member, whereas he first, second and third sections 36*a*, 36*b*, 36*c* are formed with a pair of tubular members joined by a number of plates welded therebetween.

The coupling between the central and first boom sections 32, 36*a* is generally designated by the reference numeral 40, and as indicated above, supports both horizontal and vertical inclination of the first section 36*a* with respect to the central section 32. The coupling 40 comprises two hinge pins: vertical hinge pin 42 for enabling the horizontal inclination, and horizontal hinge pin 44 for enabling the vertical inclination. Vertical hinge pin 42 is rotatably captured in a housing 46 that is welded to the central boom section 32, while the horizontal hinge pin 44 is captured by a pair of brackets 48*a*,48*b* welded to first boom section 36*a*. The vertical pin 42, which is free to rotate in housing 46, is welded to a sleeve 50 surrounding horizontal pin 44 via intermediate plates 52, 54, 56. Although not clearly indicated in FIG. 2A, a limited clearance between the plate 54 and the housing 46 prevents rearward horizontal inclination of the first section 36*a* with respect to the central section 32.

Figure 4:
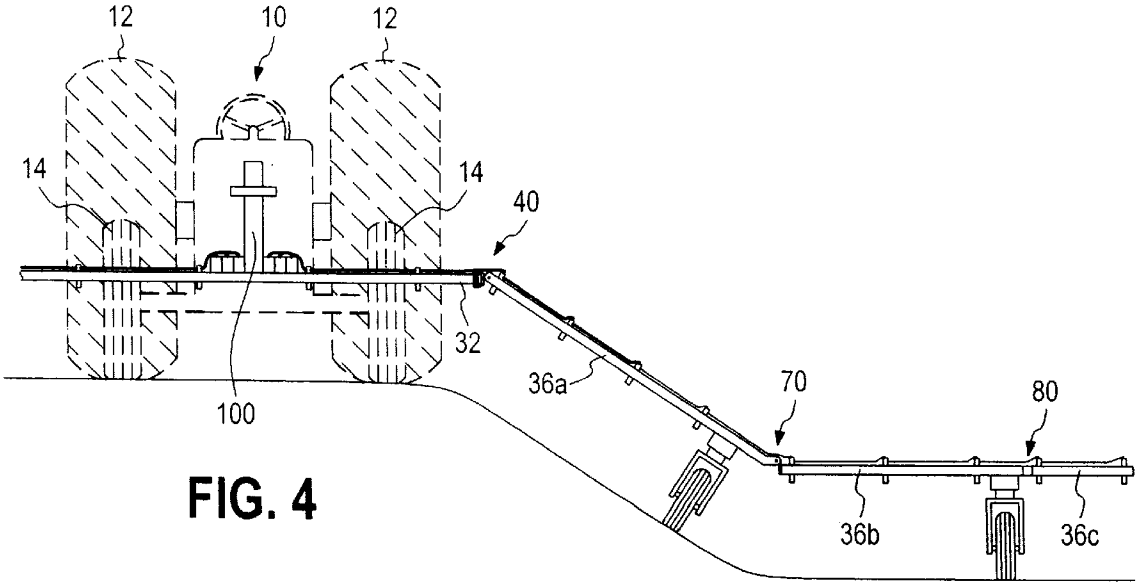
FIG. 4 is a partial frontal view of the tractor and spray boom of FIG. 1, illustrating vertical inclination of first and second boom sections to accommodate hilly terrain.
Figure 5A:
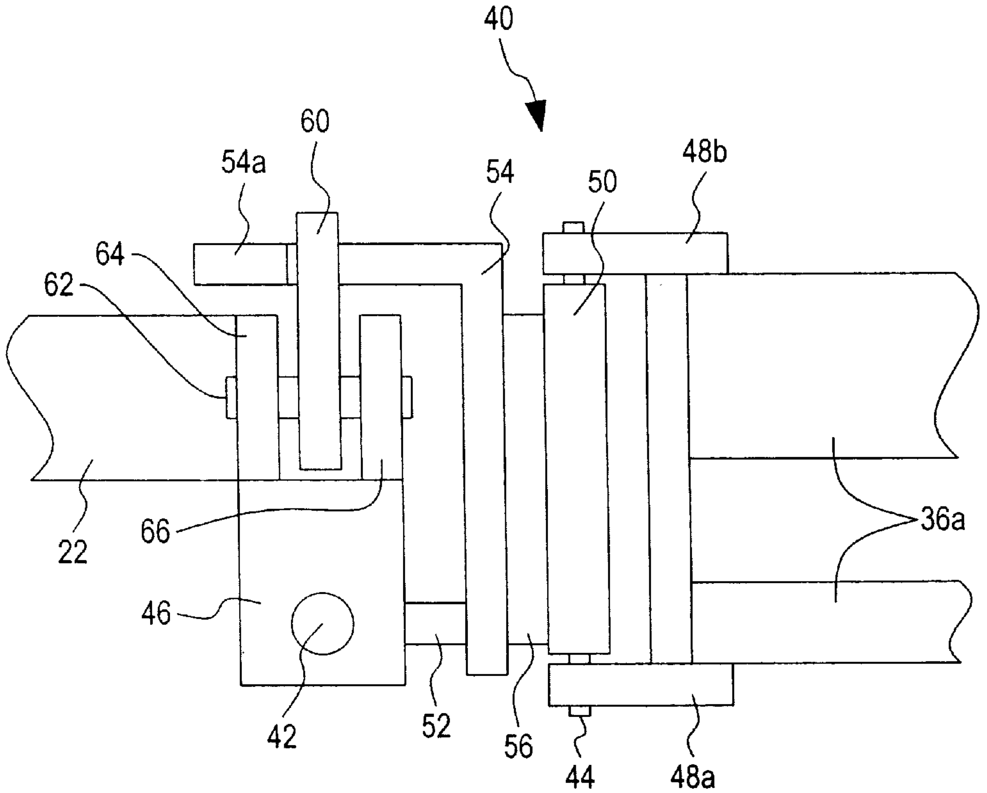
FIGS. 5A and 5B are partial top and frontal views of a coupling between central and first boom sections as depicted in FIG. 4.
Figure 5B:
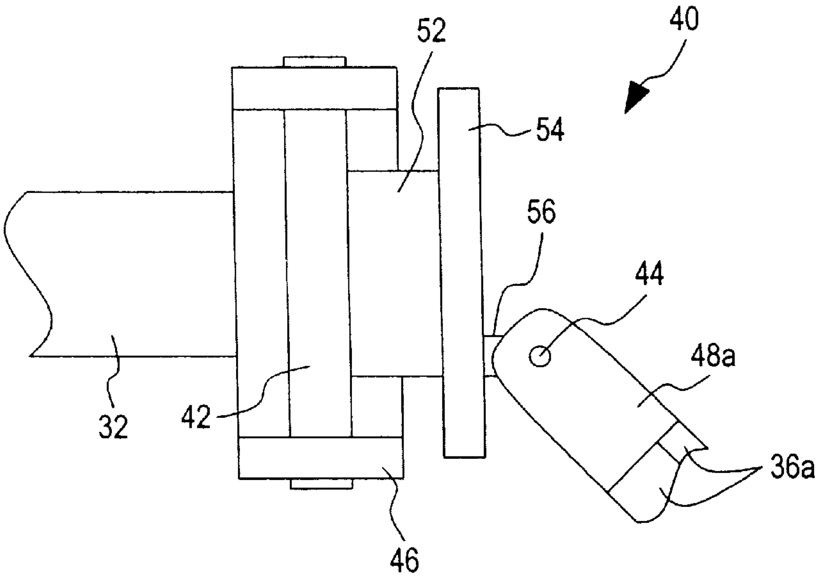

Vertical inclination of the first boom section 36*a* with respect to the central boom section 32 is illustrated in general in FIG. 4, and in detail in FIGS. 5A and 5B. FIG. 4 depicts the tractor 10 with the spray boom 24 extended as in FIG. 1, but with the tractor 10 positioned above a downward slope in the ground surface, and FIGS. 5A and 5B depict top and frontal views of the coupling 40 under such conditions. Horizontal inclination of the first boom section 36*a* with respect to the central boom section 32 is illustrated in general in FIG. 8, which depicts the tractor 10 with the spray boom 24 folded for transportation or storage.

Figure 3:
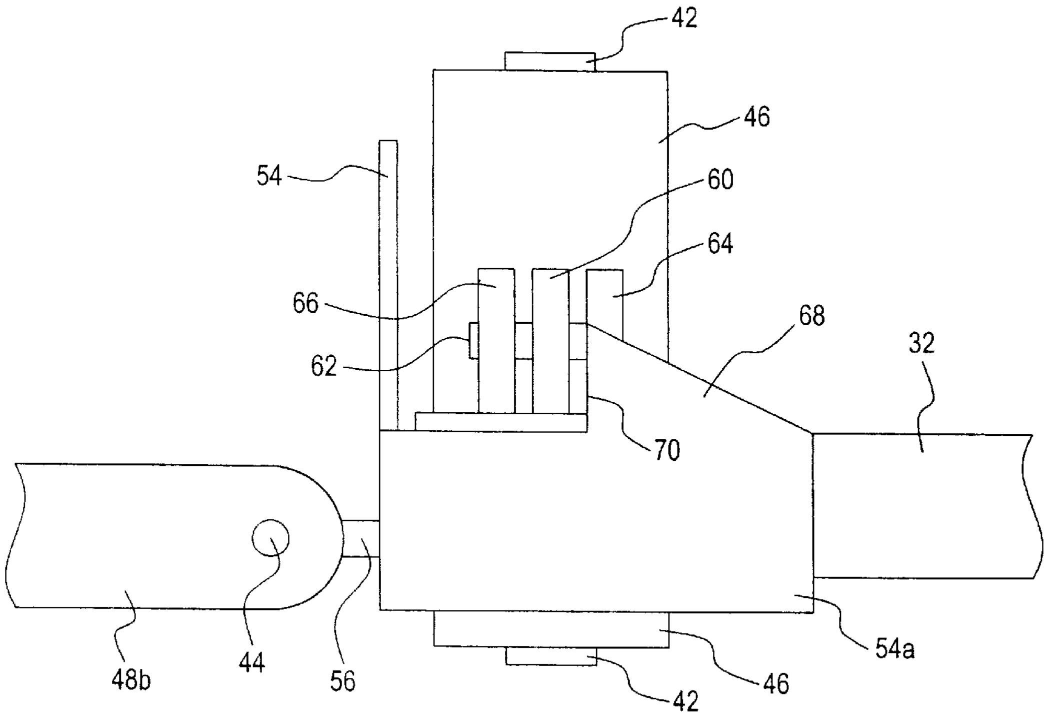
FIG. 3 is a partial rear view of a latch mechanism depicted FIG. 2A.

The coupling 40 also comprises a latch mechanism that can be automatically deployed upon full horizontal inclination of the first section 36*a* with respect to central section 32 to maintain the full horizontal inclination. Referring to FIGS. 2A and 3, the latch mechanism is formed by a lateral extension 54*a* of the plate 54 and a hinged bar 60. The plate 54 is welded to the first section 36*a*, as explained above, while the bar 60 is rotatably supported on a pin 62 captured in a pair of plates 64, 66 welded to central section 32 on either side of bar 60. As best seen in the rear view of FIG. 3, the plate extension 54*a* has a tapered leading edge 68, terminating in a vertical latching edge 70, so that as the first section 36*a* nears full horizontal inclination with respect to the central section 32, the tapered leading edge 68 engages and rotates the trailing end of bar 60 upward about pin 62. As full horizontal inclination is achieved, the vertical edge 70 moves past the bar 60, allowing the bar 60 to fall to its deployed position as depicted in FIGS. 2A and 3, whereupon interference between bar 60 and vertical edge 70 of plate extension 54*a* maintains the full horizontal inclination.

The coupling between the first and second boom sections 36*a*, 36*b* is generally designated by the reference numeral 70, and as indicated above, supports only vertical inclination of the second section 36*b* with respect to the first section 36*a*. For this purpose, the coupling 70 comprises a single horizontal hinge pin 72 that is captured by a pair of brackets 74*a*, 74*b* welded to tubular frame elements of the first boom section 36*a*. A plate 76 welded to the inboard ends of the tubular frame elements of the second boom section 36*b* extends upwardly and is welded to a sleeve 78 surrounding horizontal pin 72. This couples the first and second boom sections 36*a*, 36*b*, and permits the aforementioned vertical inclination.

Figure 6A:
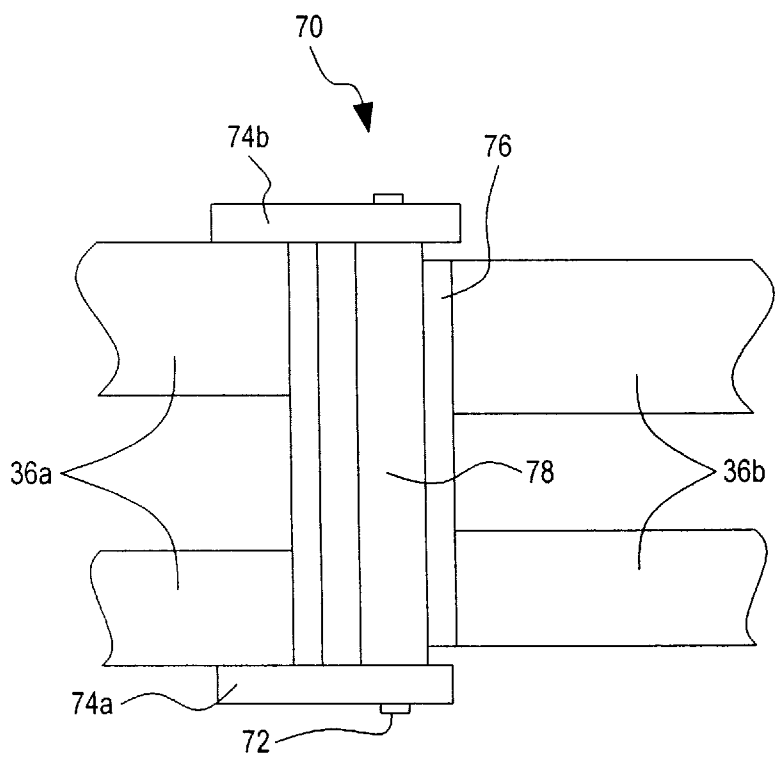
FIGS. 6A and 6B are partial top and frontal views of a coupling between first and second boom sections as depicted in FIG. 4.
Figure 6B:
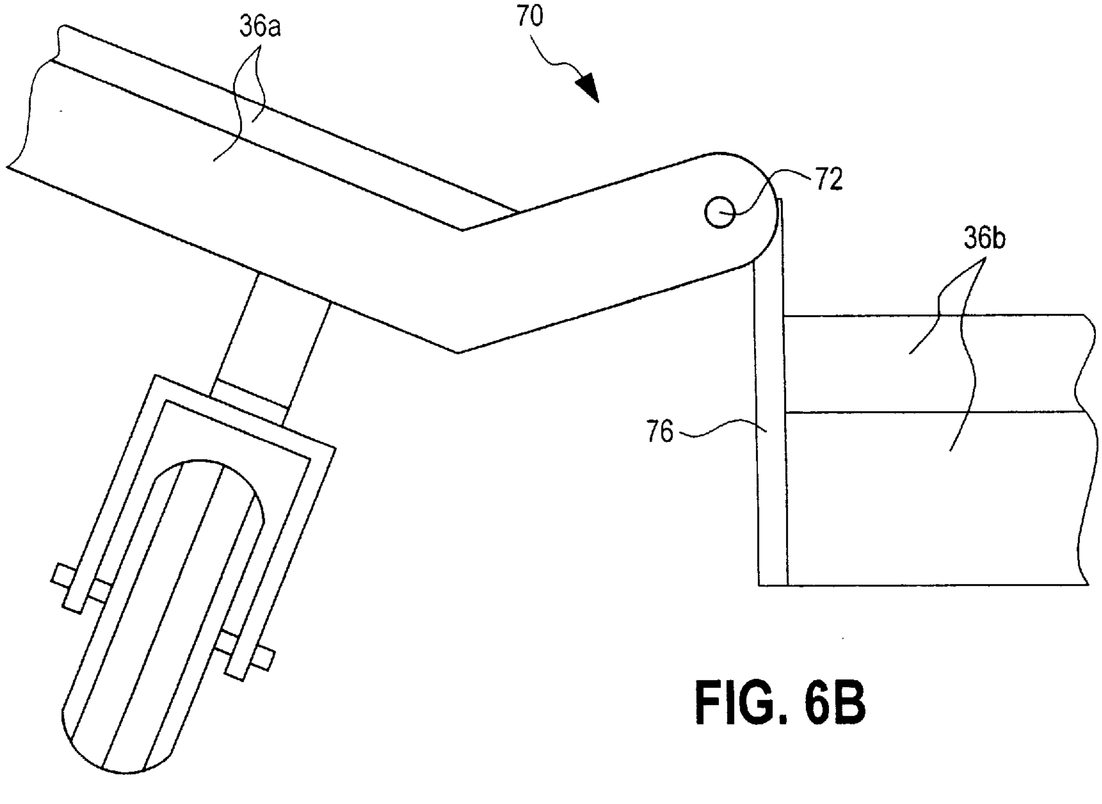
Figure 8:
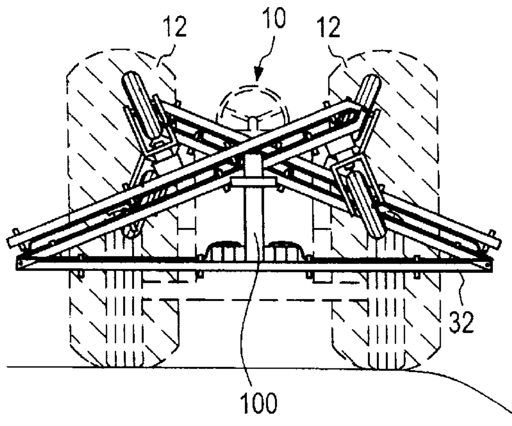
FIG. 8 is a frontal view of the tractor and spray boom of FIG. 1, with the spray boom sections folded for transportation.

Vertical inclination of the second boom section 36*b* with respect to the first boom section 36*a* is illustrated in general in FIGS. 4 and 8, and in detail in FIGS. 6A and 6B. FIG. 4 depicts the tractor 10 positioned above a downward slope in the ground surface with the spray boom 24 extended, as mentioned above, and FIGS. 6A and 6B depict top and frontal views of the coupling 70 under such conditions. FIG. 8, as also mentioned above, depicts the tractor 10 with the spray boom 24 folded for transportation or storage.

Figure 7:
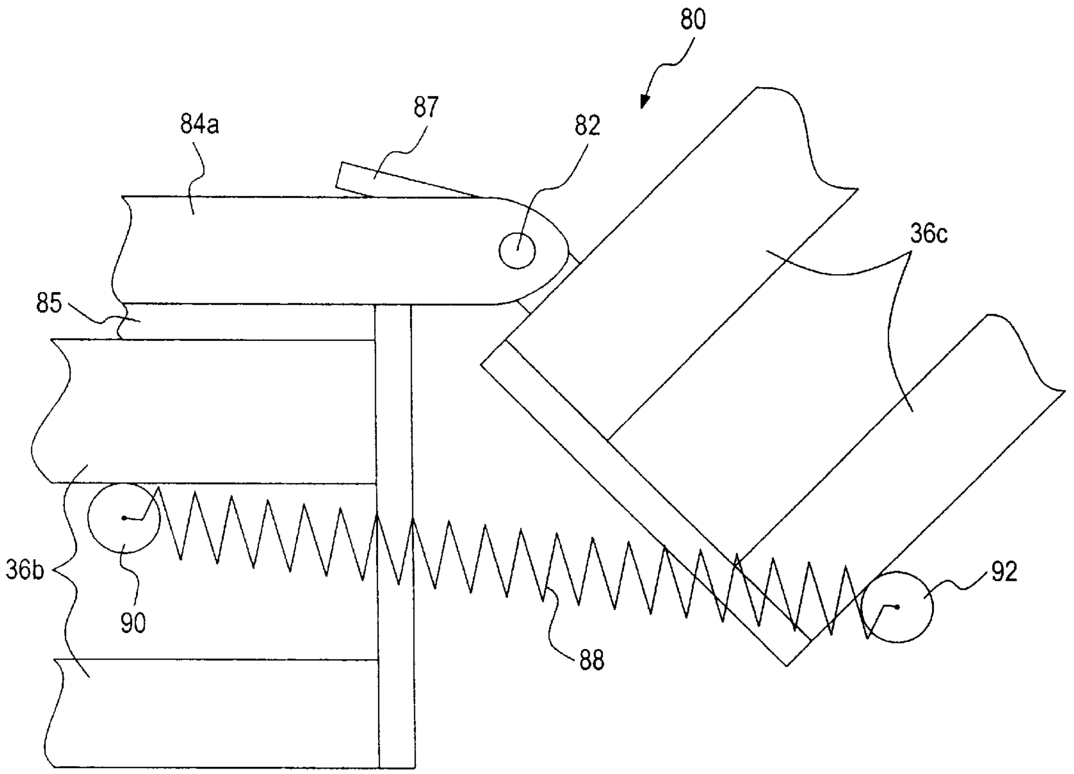
FIG. 7 is an overhead view of a coupling between second and third sections of the spray boom of FIG. 1, illustrating horizontal inclination of the third section with respect to the second section.

The coupling between the second and third boom sections 36*b*, 36*c* is generally designated by the reference numeral 80, and as indicated above, supports only rearward horizontal inclination of the third section 36*c* with respect to the second section 36*b*. For this purpose, the coupling 80 comprises a single vertical hinge pin 82 that is captured by a pair of brackets 84*a*, 84*b* welded to rearward face of the tubular frame elements of the second boom section 36*b* via spacer plate 85. A sleeve 86 surrounding the vertical hinge pin 82 is welded to the rearward frame element of boom section 36*c*; this couples the second and third boom sections 36*b*, 36*c* while permitting the aforementioned rearward horizontal inclination therebetween. An example of such rearward horizontal inclination is depicted in FIG. 7. A stop plate 87 welded to the sleeve 86 limits the degree of permitted horizontal inclination when sleeve 86 is rotated to the point where stop plate 87 contacts the spacer plate 85. A spring 88 is strung between a vertical post 90 welded to the rearward tubular member of second boom section 36*b* and a vertical post 92 welded to the forward tubular member of third boom section 36*c*. The spring 88 therefore stretches across the coupling 80, and biases the second and third boom sections 36*b*, 36*c* into alignment as shown in FIGS. 1 and 2A–2B, for example.

Figure 9:
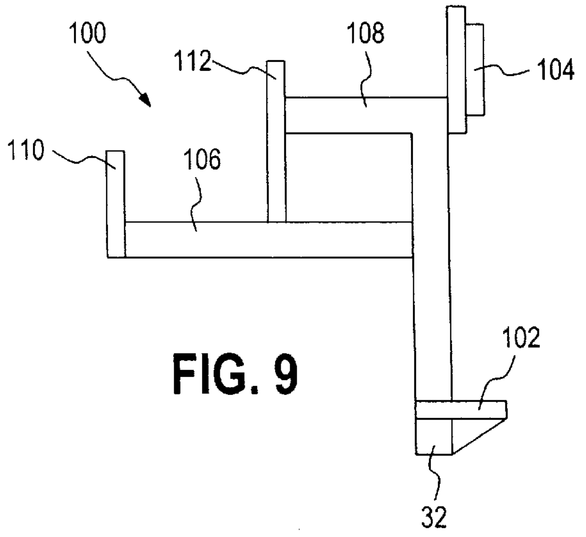
FIG. 9 is a side view of a spray boom bracket depicted in FIGS. 1, 4 and 8.

Finally, FIG. 9 depicts a side view of a bracket 100 welded to the central boom section 32. The bracket 100 has several features, including a rearwardly extending mounting plate 102 for attachment of the spray boom 24 to the tractor 10, a vertical mounting plate 104 for attachment of the spray distribution system 26, and forwardly extending arms 106 and 108 for supporting the boom arms 34, 36 when in a folded state as depicted in FIG. 8. With the boom arms 34, 36 are so positioned, the vertical plates 110 and 112 retain the boom arms 34, 36 in position during operation of the tractor 10.

The aforementioned features cooperate to provide a spray boom that is inexpensive, easy to use, and capable of maintaining a consistent and optimal distance between the spray nozzles 30 and the ground on hilly and uneven terrain of the sort commonly encountered on golf courses and parks. Being mounted on the front of the tractor 10, the spray boom 24 is easy to see for purposes of controlling the extent of the spray pattern and maneuvering around obstacles such as trees. Additionally, the boom 24 may be conveniently stored in the folded position with a pair of simple stands (not shown) having posts adapted to be received in corresponding tube members welded to the central boom section 32, one such tube member 33 being shown in FIG. 2A.

To mount the spray boom 24 on tractor 10, the operator merely drives the tractor up to the stored folded spray boom, transfers the boom 24 from the stands to a horizontal mounting plate on the tractor, and bolts the boom 24 to the tractor mounting plate via mounting plate 102 of bracket 100. A central pin (not shown) extending downward from the plate 102 and adapted to be received in a corresponding opening in the tractor mounting plate may be provided to facilitate centering of the spray boom 24 with respect to the tractor 10. After coupling the hose 28 and an electrical connector (not shown) to the spray distribution system 26, the operator drives the tractor 10 with attached spray boom 24 to a desired location, and manually extends the boom arms 34 and 36. The same procedure is used to extend each of the boom arms 34 and 36, with the forward-most boom arm being extended first. The procedure is simply as follows: (1) lift the respective boom arm off bracket 100, (2) rotate the boom arm forward and lower it until the respective wheel 34*d*, 36*d* engages the ground, (3) rotate the boom arm about the respective hinge pin 42 until the latching mechanism (plate 54+bar 60) locks the boom arm in place, and (4) rotate the second boom section about the respective hinge pin 72 until the respective wheel 34*e*, 36*e* engages the ground. When both boom arms 34, 36 have been so deployed, the operator is ready to begin spraying the intended area. If the end of either boom arm 34, 36 contacts an obstacle such as a tree or post, the coupling 80 permits temporary rearward inclination of the respective third boom section 34*c*, 36*c* to prevent damage to the spray boom 24, whereafter the spring 88 returns the respective third boom section 34*c*, 36*c* to its normal position. When finished spraying, the operator stops the tractor 10, releases the latching mechanisms by rotating the respective bars 60 upward, reverses the aforementioned procedure for each of the boom arms 34, 36 (conveniently, either arm 34, 36 may be folded first), and drives the tractor 10 with attached spray boom 24 to another location. To dismount and store the spray boom, the mounting procedure explained above is simply reversed.

In summary, the present invention provides an easily operated vehicle-borne spray boom having multiple articulated sections that are conveniently foldable for storage or transportation, with the sections being individually supported with respect to the ground to maintain a consistent and optimal distance between the boom sections and the ground on hilly and uneven terrain. While described in reference to the illustrated embodiment, it is expected that various modifications in addition to those mentioned above will occur to those skilled in the art. Thus, it will be understood that spray booms incorporating these and other modifications may fall within the scope of this invention, which is defined by the appended claims.

What is claimed is:

1. An articulated boom supported by a vehicle and configured to spray a liquid product on a ground surface in proximity to said vehicle, the boom comprising:

a central section rigidly secured to a mounting plate on a leading face of said vehicle, and having first and second ends extending laterally in opposite directions from said mounting plate;

a pair of first boom sections supported by first ground-engaging wheels and coupled to opposing ends of said central section by a pair of first coupling mechanisms that permit both vertical and horizontal inclination of said first boom sections with respect to said central section; and releasable latch mechanisms for maintaining full horizontal inclination of said first boom sections with respect to said central boom section when said boom is in a deployed state.

2. The articulated boom of claim 1, wherein said first ground-engaging wheels and the vertical inclination permitted by said first coupling mechanisms allow said first boom sections to follow a contour of said ground surface independent of said central section.

3. The articulated boom of claim 1, wherein the horizontal inclination permitted by said first coupling mechanisms allows said first boom sections to fold forward and into abutment with said central section while being supported by said first ground-engaging wheels for storage of said boom when the respective latch mechanisms are released.

4. The articulated boom of claim 3, wherein said central section includes a bracket member for supporting said first boom sections when said first boom sections are folded into abutment with said central section, and the vertical inclination permitted by said first coupling mechanisms allows said first boom sections to be vertically inclined with respect to said central section when supported by said bracket member.

5. The articulated boom of claim 1, further comprising:

a pair of second boom sections supported by second ground-engaging wheels and coupled to opposite outboard ends of said first boom sections by a pair of second coupling mechanisms to permit vertical inclination of said second boom sections relative to respective first boom sections.

6. The articulated boom of claim 5, wherein said second ground-engaging wheels and the vertical inclination permitted by said second coupling mechanisms allow said second boom sections to follow a contour of said ground surface independent of the respective first boom sections.

7. The articulated boom of claim 1, further comprising:

a pair of third boom sections coupled to opposite outboard ends of said second boom sections to permit horizontal inclination of said third boom sections relative to respective second boom sections; and spring elements for biasing said third boom sections into alignment with said respective second boom sections.

8. The articulated boom of claim 1, wherein said releasable latch mechanisms each comprise:

a laterally extending plate attached to one of said central boom section and a respective first boom section; and a rearwardly extending bar attached to the other of said central and respective first boom sections.

9. The articulated boom of claim 8, wherein:

said rearwardly extending bar has a first state for which it engages said laterally extending plate upon full horizontal inclination of the respective first boom section with respect to said central boom section to maintain such full horizontal inclination, and a second state for which it cannot engage said laterally extending plate.

* * * * *